Figure 2:
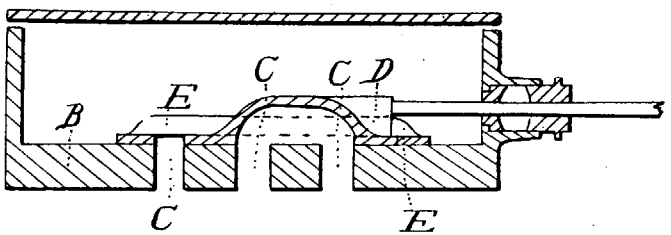

8480X

T. B. Stillman,

Steam Cut-Off.

Patented Oct. 30, 1834.

AM. PHOTO-LITHO. CO. N. Y. (OSSORNE'S PROCESS.)

Thomas B. Stillman

The schedule referred to in these Letters Patent and making part of the same containing a description in the words of the said Thomas B. Stillman himself of his Improvement in Valves for Steam Engines.

To all whom it may concern

Be it known that I Thomas B. Stillman of the City of New York, in the County and State of New York have invented a new and useful improvement in the valves of Steam Engines" the object and intent of which is to combine the common slide steam valves with a cut off valve, so that both may be operated by the same excentric or cam upon the same seat and each retain their distinctive character for the particular purposes of a Steam and cut off valve. And the method by which I obtain such object is fully set forth in the following specification and in the drawings thereunto annexed which make a part of said Specification.

Figure 3:
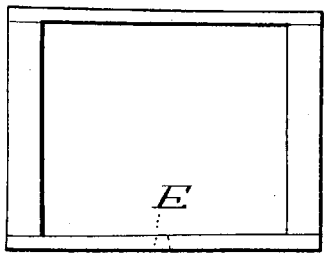
Figure 4:
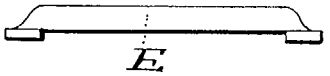
Figure 1:
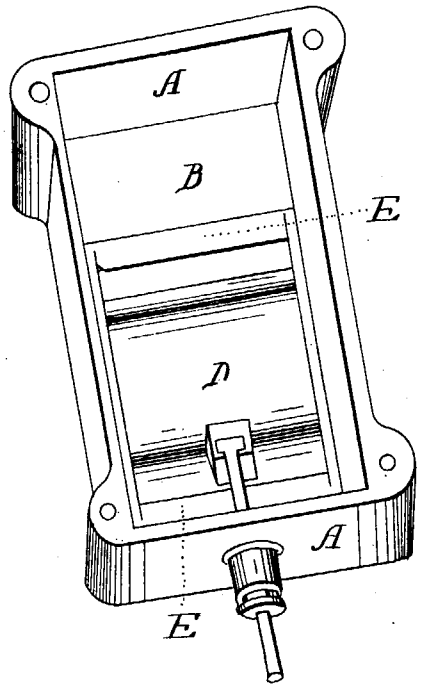

The valve which I propose to adopt will apply with trifling variations to most of the different forms of sliding steam valves that are now in use. But the form to which I shall confine myself in this description is that called the single short slide valve, the adaptation of said valve to which will enable me to explain its principle in the fewest words. Fig. 1. is a perspective of a steam chest containing the steam and cut off valves as hereinafter described, Fig. 2, is a longitudinal section of steam chest and valves, Fig. 3. is a plan and Fig. 4. is a side view of the cut off valve. The letters of reference designate the similar parts in the several figures. A.A. is a steam chest the cover being removed to show the valves within. B. is the valve seat which is made somewhat longer than the usual proportions for the purpose of admitting the cut off valves upon it, within the Steam Chest and also to allow the steam valve more vibration than is commonly necessary— c.c.c. are the openings in the valve seat over which the valves operate. D. is the common slide valve with the valve rod passing through the end of the Steam Chest. E.E. is the cut off valve which may be formed of several pieces or cast in one piece of brass or other metal suitable for the purpose. The two ends of this valve are faced to suit the face of the valve seat and the inner edges are fitted to the ends of the steam valve so as to be steam tight when in contact which will be alternately at each end of the valve when in operation. The distance between the inner edges of the ends of the cut off valve should be equal to the length of the steam valve and of one of the openings in the valve seat. Through the space formed by the difference of length between the two valves, the steam enters the openings but the stroke of the valve is not complete until the end of the cut off ~~valve~~ is drawn over the opening now seen between the two valves in Fig. 1. The steam will be cut off at half stroke if the valves are worked by an eccentric, but when a cam is used it may be cut off at any required proportion of the stroke. When the operation of the cut off is not required, as in starting the engine, the stroke or throw of the valve is diminished by means of a moveable arm in the rocking shaft with an adjusting screw or otherwise, which decreased stroke leaves the cut off valve nearly at rest upon the valve seat, while the steam valve continues to perform its functions. It is not essential that the cut off valve should have the same form that it has in the drawings. The ends may be separate from each other and connected to the steam valve, or a single connection since the steam valve would answer, but I prefer the present form as it is not only better on account of strength, but is more easily confined by the springs which I cause to bear upon each side to prevent its sliding upon the valve seat except as impelled by the steam valve. What I claim as my invention and improvement in valves of steam Engines is the attaching of the frame or valve as above described to the common slide valves by which they are combined so as to require but one excentric or cam for their proper movement and effect both as a steam and cut off valve, the whole being effected substantially as above described, and in any required proportion according to the size of the Engine, In witness whereof I have set my hand this 11th day of December 1833.

Witnesses
Wm P. Hallett
Jno [illegible]

Thomas B. [illegible]

[illegible]

Drawing

[illegible]